United States Patent [19]

Gardes

[11] Patent Number: 4,599,172
[45] Date of Patent: Jul. 8, 1986

[54] FLOW LINE FILTER APPARATUS

[76] Inventor: Robert A. Gardes, 229 Smith Reed Rd., Lafayette, La. 70507

[21] Appl. No.: 686,072

[22] Filed: Dec. 24, 1984

[51] Int. Cl.$^4$ .......................................... B01D 23/02
[52] U.S. Cl. .................... 210/314; 166/234; 175/66; 210/409; 210/433.1; 210/460
[58] Field of Search ................. 55/387; 166/227, 234; 175/66, 206; 210/314, 316, 409, 413, 433.1, 449, 460

[56] References Cited

U.S. PATENT DOCUMENTS

| | | | |
|---|---|---|---|
| 550,583 | 12/1895 | Brinckman et al. | 210/433.1 X |
| 1,843,242 | 2/1932 | Rafton | 210/433.1 X |
| 1,979,740 | 11/1934 | Hamm | 166/234 |
| 2,169,675 | 8/1939 | Bays | 175/66 |
| 2,514,585 | 7/1950 | Natland | 175/66 X |
| 2,661,095 | 12/1953 | Koth | 210/433.1 |
| 2,738,225 | 3/1956 | Meek | 55/387 X |
| 2,870,990 | 1/1959 | Bergey | 175/66 |
| 2,889,048 | 6/1959 | Nordin | 210/409 |
| 3,353,678 | 11/1967 | Dragon | 210/433.1 X |
| 3,774,702 | 11/1973 | Elenburg | 175/66 |
| 3,794,179 | 2/1974 | Doucet | 210/433.1 X |
| 3,880,762 | 4/1975 | Wise | 210/460 |
| 4,064,938 | 12/1977 | Fast | 210/460 X |
| 4,098,698 | 7/1978 | Lamothe | 175/206 X |
| 4,116,288 | 9/1978 | Love | 175/66 |
| 4,410,425 | 10/1983 | Gardes | 210/449 X |

Primary Examiner—Robert Spitzer
Attorney, Agent, or Firm—Pravel, Gambrell, Hewitt & Kimball

[57] ABSTRACT

An apparatus for filtering drilling mud that is being recirculated out of the drill hole. A flow conveying tubular section has at its first lower end a flanged base portion sealably attachable to the well casing or blow out preventer and is open-ended at its second end for allowing fluid flow therethrough. Also provided is an outer tank portion encapsulating substantially the upper half portion of the tubular section. The tank portion has an open-ended top for receiving flow out the upper end of the flow conveying tubular section and is integrally attached at its bottom portion to the outer surface of the tubular section to define a container for receiving fluid flow from the tubular section. An adjustable primary filter is provided on that portion of the tubular section enclosed by the tank portion for filtering and conveying fluid out of the tubular section into the tank portion. There is provided a secondary filter having a plurality of angulated vanes defining an angulated mud filtering surface.

8 Claims, 6 Drawing Figures

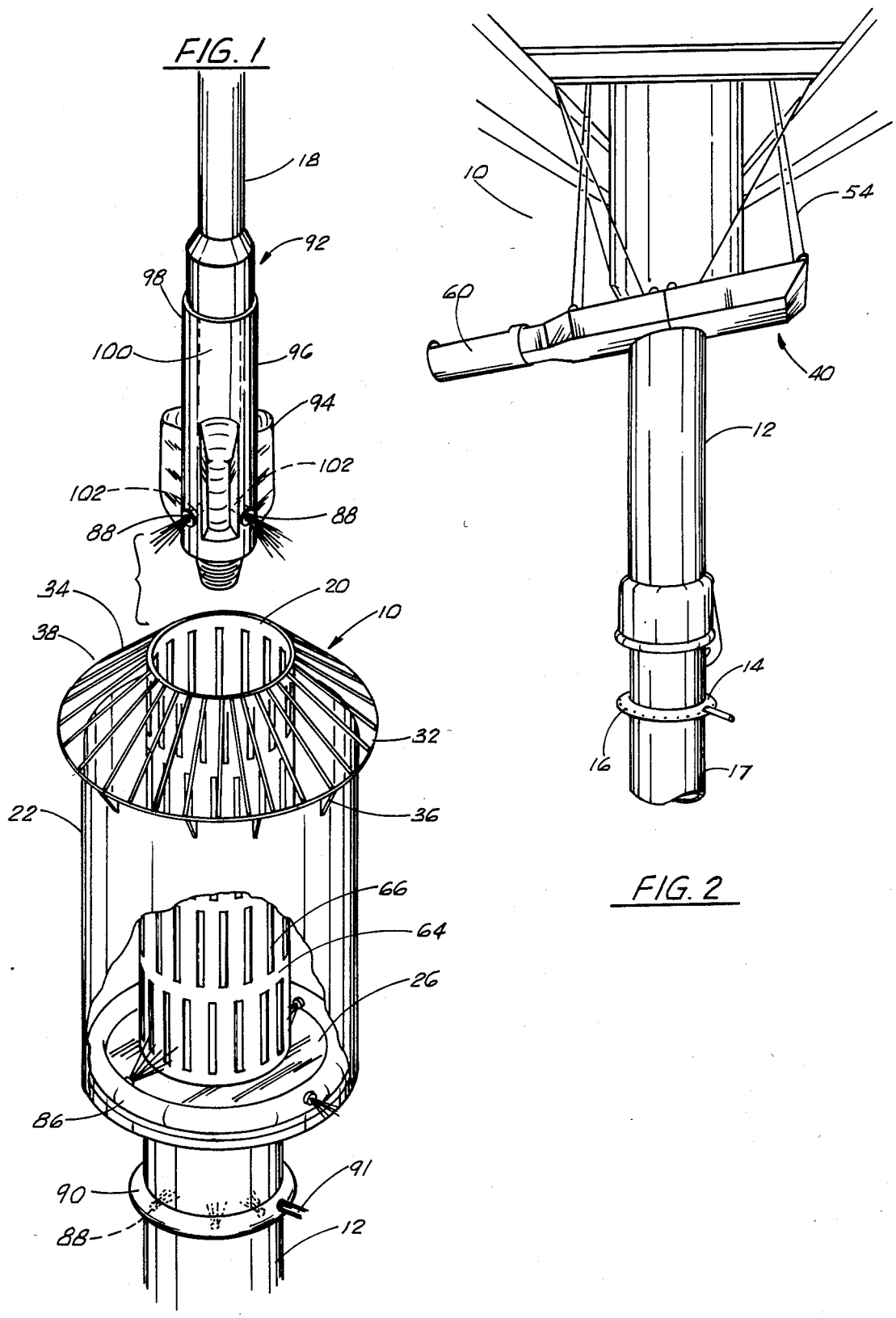

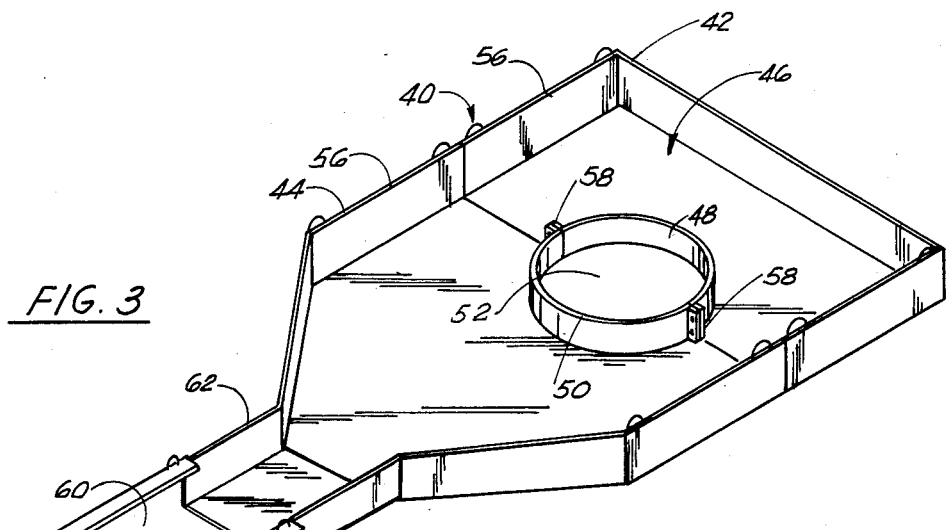
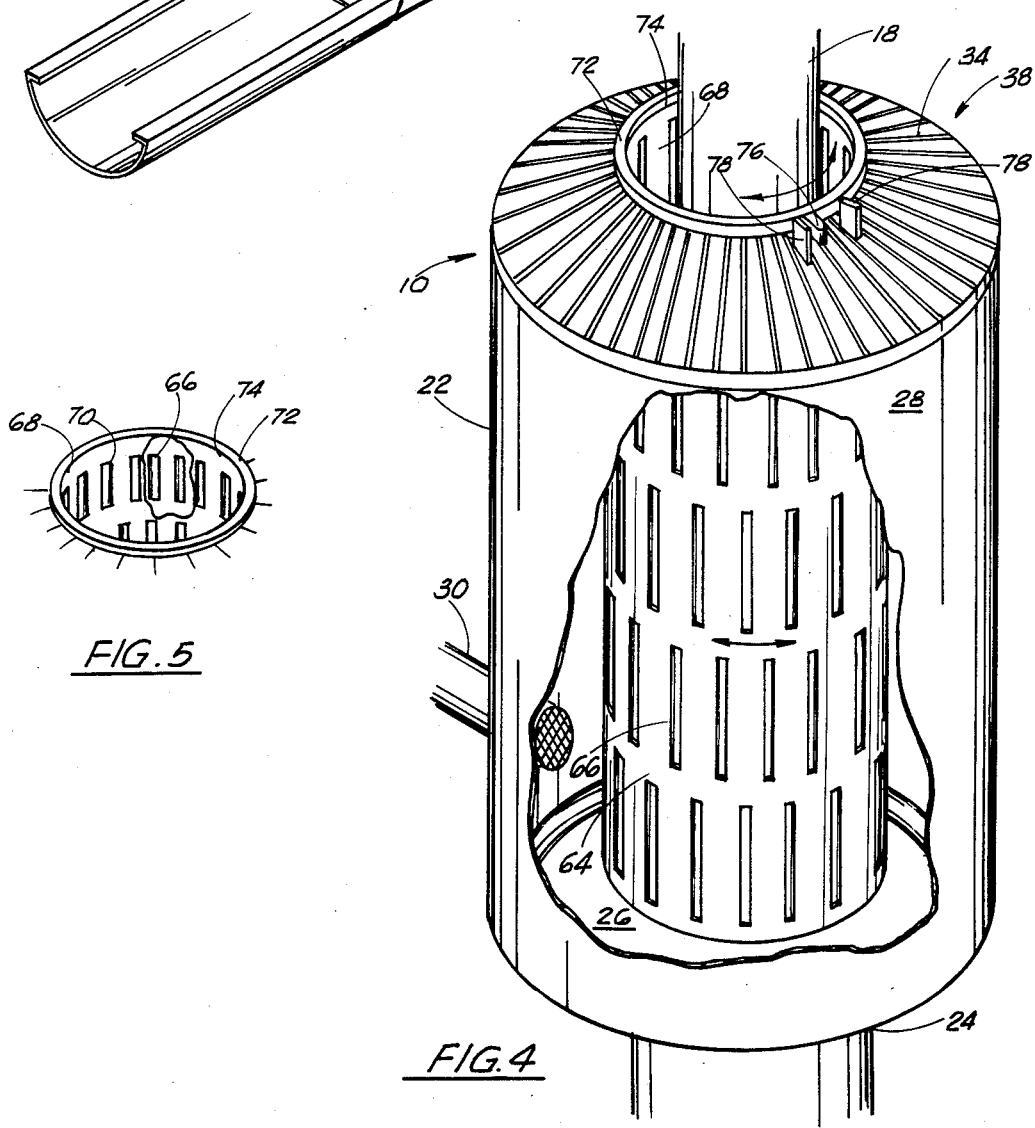

FLOW LINE FILTER APPARATUS

BACKGROUND OF THE INVENTION

1. Field of the Invention

The present invention relates to offshore drilling equipment. More particularly, the present invention relates to improvements in a device of the type illustrated in U.S. Pat. No. 4,410,425, issued to the present applicant for filtering the drilling fluid and cuttings that are brought to the wellhead to be recirculated through a flow line.

2. General Background

During the drilling process and the production of offshore oil and gas wells, cuttings and other debris resulting from the action of the drill bit within the drill hole are brought up to the surface by means of pumping drilling fluid or mud under pressure down the drill pipe into the drill hole and circulating the fluid along with the cuttings and other materials back to the surface through the exterior casing. Upon reaching the surface of the drilled hole, the mud, cuttings and other material are routed up the well casing through the wellhead into a flow line which angularly allows the mud and cuttings to flow away from the drill site to separators where the cuttings are separated from the drilling mud for recirculation of the drilling mud under pressure back down into the well hole for reuse.

One of the most troublesome problems confronted in this operation is the constant coagulation and accumulation of mud and cuttings within the flow line resulting in ultimate blockage of the flow of drilling mud and cuttings therethrough. When the flow line becomes blocked, the flow of drilling mud through the flow line is interrupted. This results in the mud and cuttings being forced up to the surface on the drill floor rather than through the flow line. This causes the loss of drilling mud or fluid which is expensive and time consuming to replace as well as creating an untidy and unsafe work area at the wellhead due to the presence of drilling fluid and cuttings. The time required for unclogging of the flow lines creates rig down time and loss of valuable revenues.

Several apparatuses have been patented which attempt to serve as a filter for the cuttings from a well. They are as follows:

U.S. Pat. No. 3,880,762, issued to Roger Wise, entitled "Separator For Cuttings" teaches a separator for drill bit cuttings being disposed on the top of a well pipe having a container surrounding the pipe in a slide area on the top of the container. The slide area is comprised of a plurality of spaced, elongated elements inclined downwardly from the top of the pipe sleeve. This particular patent addresses the problem of filtering out cuttings which may collect and clog the shaker screen. This particular apparatus would, in effect, require a filter screen which would filter cuttings of a very minute size to prevent clogging of the shale shaker screen and for the purposes of the present invention would be ineffectual and inoperative.

U.S. Pat. No. 4,116,288, issued to William W. Love, entitled "Method And Apparatus For Continuously Separating Lost Circulating Material From Drilling Fluid" teaches the use of a method and apparatus for processing drilling mud. The lost circulating material is retained on a coarse screen while the mud and drilling solids pass through a finer mesh screen. This particular apparatus is a rather involved separator apparatus and would not suit the particular needs of the present invention.

U.S. Pat. No. 4,410,425, issued to the present applicant, discloses a filter apparatus effective for filtering cuttings from drilling fluid as is the purpose of the present invention but is presented with the problems of a primary filter which is not adjustable, a drilling fluid collection area which is not completely efficient during periods of increased flow of drilling fluid, the lack of a means for collecting and guiding cuttings filtered out away from the work site and the lack of a means for easily cleaning cuttings and drilling fluid which may accumulate in the filter and collection tank.

Other patents which are presently in the art are U.S. Pat. No. 3,774,702, issued to Wayland Ellenburg entitled "Formation Chip Sampling Method", U.S. Pat. No. 2,169,675, issued to G. S. Bays, entitled "Back Pressure Control In Pressure Drilling", U.S. Pat. No. 2,514,585, issued to M. L. Natland, entitled "Method For Drilling Wells" and U.S. Pat. No. 2,870,990, issued to T. G. Bergey, entitled "Drilling Fluid Method" are all directed toward cleaning drilling mud and recirculation thereof, but each of these particular apparatuses do not meet the needs of the present invention.

SUMMARY OF THE INVENTION

The preferred embodiment of the present invention solves the aforementioned problems in a straightforward and simple manner. What is provided is a unit which is fixedly attachable to the top portion of the blow-out preventers or hydril to receive the flow of mud and cuttings from within the well casing as it is pumped upward. The apparatus contains a flow conveying tubular section which is sealably attachable at its lower end to the hydril and open ended at its upper end for allowing fluid flow therethrough. Provided along the wall of the flow conveying tubular section is a plurality of slotted openings circumferentially spaced around the upper portion of the tubular section which serves as the primary filter means for filtering the cuttings from the drilling fluid. A tubular sleeve positioned along the interior wall of the flow conveying tubular section has a plurality of slotted openings spaced around its circumference and is movable within the flow conveying tubular section for adjusting the size of the primary filter slots and restricting the amount and size of cuttings which can enter the tank area through the primary filter means. Encasing that portion of the tubular section containing the slotted openings is an outer tank portion which comprises a floor section sealably and integrally attached to the outer circumferential wall of the tubular section and having a wall portion defining an enclosure tank with the tank having an open-ended fluid conveying tube or flow line angularly extending out of and away from its side wall. The upper end of the tank portion is flared outwardly to increase the diameter of the liquid collection area and is fixedly connected to the upper end of the tubular portion via a secondary filtering means. A means for cleaning or breaking up cuttings and drilling mud which may accumulate in the tank portion, primary filter means and tubular portion is provided in the form of a jetting system which is connected to the rig fill up line.

In the utilization of the apparatus, the drilling mud and cuttings flow upward through the well casing, through the hydril or blow out preventers and into the tubular portion where the major portion of the fluid flow is filtered through the slotted openings in the wall of the tubular portion and into the tank portion where it is then directed to filters through the flow line connected to the tank portion. The large chunks of cuttings and debris which are filtered out of the drilling fluid by the primary filter means flow upward through the top of the tubular portion where they are filtered by the secondary filter means and may slide off of the top portion and be prevented from entering the tank portion and the flow line. The secondary filter means in the top portion allows drilling fluid or other small cuttings which have traveled through the top portion to enter the tank portion and be conveyed through the flow line to the filters while the larger debris and cuttings which are unable to enter the tank portion fall to the side, thus preventing clogging of the flow line. The larger debris and cuttings which are unable to enter the tank portion fall off the secondary filter means to the side into a trough which guides these larger cuttings away from the platform.

Therefore, it is an object of the present invention to provide an apparatus for filtering downhole drilling mud between the well hole and the flow line capable of collecting and filtering drilling fluid during periods of increased flow.

It is another object of the present invention to provide a means for collecting and directing away from the rig floor large portions of debris which are prevented from re-entering the apparatus and the flow line.

It is a further object of the present invention to provide a means for breaking up any mud and cuttings which may accumulate in the apparatus of the present invention.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and, wherein:

FIG. 1 is a perspective partially cutaway view of the preferred embodiment of the apparatus of the present invention.

FIG. 2 is a view illustrating the means for collecting larger portions of cuttings and debris as it appears mounted beneath the apparatus of the present invention.

FIG. 3 is a perspective view of the means for collecting larger portions of cuttings and debris filtered from the drilling fluid.

FIG. 4 is a perspective partial cutaway view illustrating the means for adjusting the primary filter of the present invention.

FIG. 5 is a partial cutaway view illustrating the alignment of the means for adjusting the primary filter with the interior of the apparatus of the present invention.

DETAILED DESCRIPTION OF THE PREFERRED EMBODIMENT

Figure 6:
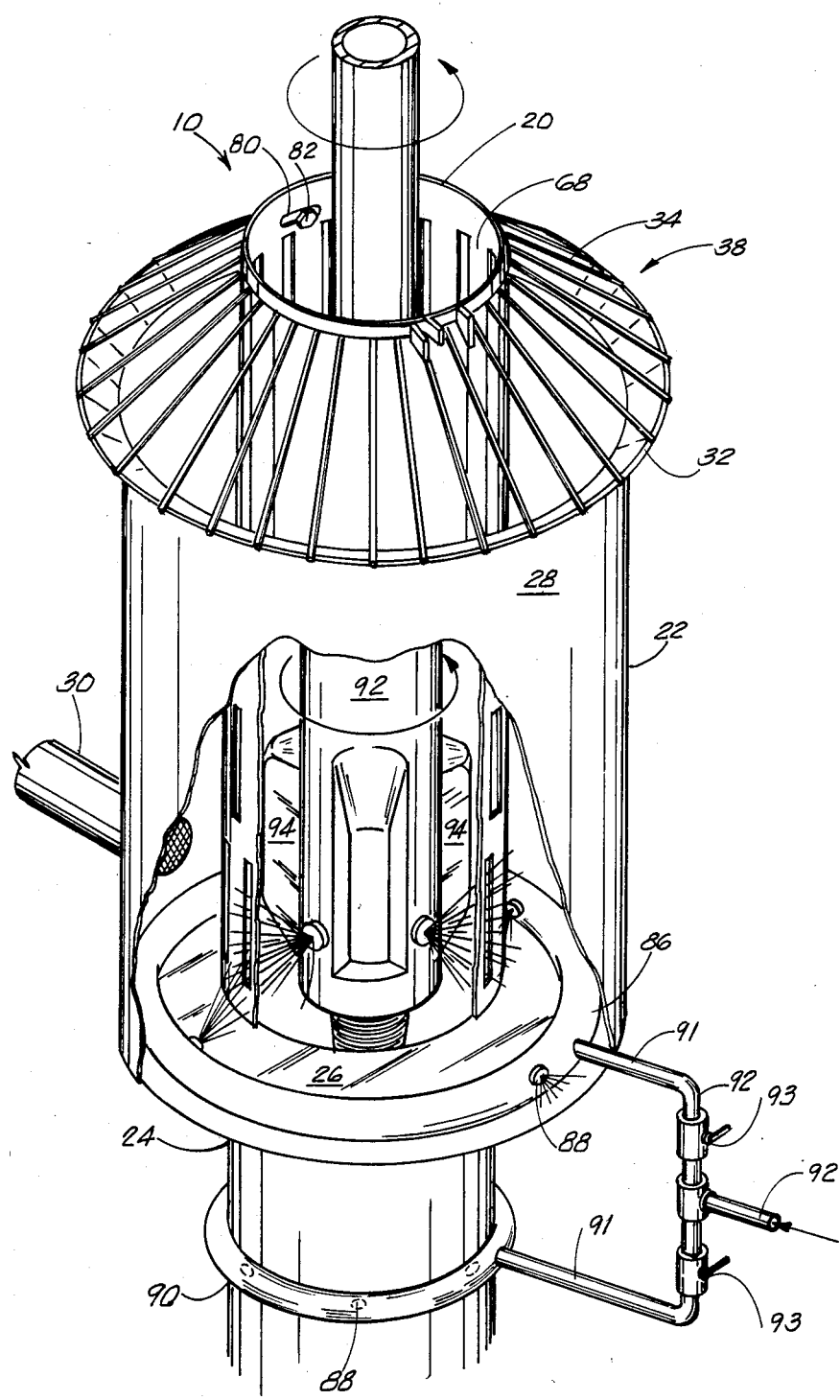
FIG. 6 is a perspective partial cutaway view of the preferred embodiment of the invention as it appears with the sub-jetting means inserted in the apparatus of the invention for removing accumulated cuttings and debris from the primary filter and means for adjusting the primary filter.

Referring now to the drawings, it is seen that the preferred embodiment of the apparatus is generally referred to by the numeral 10. In the preferred embodiment, apparatus 10 is generally comprised of an elongated tubular portion 12, best seen in FIG. 2 which is sealingly engageable to the top portion of a blow out preventer or casing above the blow out preventer. The means of connecting apparatus 10 to the blow preventer is preferably comprised of a flange 14 extending radially from tubular portion 12 and provided with a series of bolts 16 for engagement to the blow out preventer or casing 17. Tubular portion 12 is open-ended at both ends and when attached to a blow out preventer or the casing 17 above comprises an extension of the fluid flow conveying section for drilling fluid returning from the borehole under pressure. Tubular portion 12 preferably is provided with a diameter of 20 inches which is equal to the average well casing so that drill string 18, seen in FIG. 4, which has an average diameter of 6 inches may easily fit through tubular portion 12 during normal drilling operations while still allowing sufficient room for flow of drilling fluid and cuttings and debris which are carried up the well hole by the flow of the drilling fluid. In the preferred embodiment, apparatus 10 is located between the drill floor and the wellhead deck.

In the preferred embodiment, as best seen in FIGS. 1, 4 and 6, tubular portion 12 is surrounded near its uppermost portion by tank portion 22. Tank portion 22 extends from a point slightly below upper end 20 of tubular portion 12 down to a point 24 approximately halfway down the length of tubular portion 12.

Tank portion 22 is preferably circular but could be formed into a variety of other shapes and is sealably connected to tubular portion 12 at the lower portion of tank 22 by bottom plate portion 26 and wall portion 28 of tank 22. Bottom plate 26 is integrally attached to tubular portion 12 and wall 28, therefore forming an annular portion encapsulating substantially the upper half of tubular portion 12. Tank portion 22 is provided with fluid conveying tube 30, best seen in FIGS. 4 and 6, which is in fluid communication with the interior of tank 22 and angled downwardly and away from tank 22 for conveying drilling fluid within tank 22 to separators and filters for processing of drilling fluid so that it may be recirculated through the well bore during drilling operations.

The uppermost portion of wall 28 of tank 22 is provided with an upper edge 32 which is flared outwardly. Edge 32 is flared outwardly at an angle of approximately 45° to wall 28 and extends approximately 3 inches beyond wall 28. This provides an increase in the diameter of the liquid collection area between tubular portion 12 and tank portion 22 of approximately 6 inches. This increase in collection area serves to collect any drilling fluid and cuttings in tank 22 through grating 34 that would normally be lost by spilling over the edge of tank 22. This is an aid in preventing the loss of drilling fluid and also in maintaining a cleaner and safer work area. Supporting ribs 36 are rigidly attached on the outer portion of wall 28 and flared edge 32 to provide support thereto.

In the preferred embodiment, tank portion 22 has upper flared edge 32 fixedly attached to upper end 20 of tubular portion 12 via grating 34 which defines a secondary filter or seive means 38 between tubular portion 12 and wall 28 of tank portion 22, as seen in FIGS. 1, 4 and 6.

As best seen in FIGS. 1 and 6, upper end 20 of tubular portion 12 is slightly higher than upper flared edge 32 of tank portion 22 so that secondary filter means 38 defined by grating 34 comprises an angulated surface which descends away from tubular portion 12 toward flared upper edge 32 and preferably at an angle of 20° to 30°.

Secondary filter means 38 helps to prevent clogging of flow line 30 by large chunks of cuttings and debris which are brought upward from the wellbore in the drilling fluid by allowing small particles of debris and cuttings to filter through grating 34 and into tank 22 and flow line 30 but prevents large portions of cuttings and debris from entering flow line 30 by the filtering action provided by grating 34 to the larger chunks of cuttings. The larger particles of cuttings and debris are filtered out of the drilling fluid and fall to the side of apparatus 10 as they roll off the angulated grating 34.

A means for collecting the larger portions of debris and cuttings which slide off of grating 34 is provided below tank portion 22 and illustrated in FIGS. 2 and 3. Trough 40 is generally comprised of two main sections 42, 44 which are releasably mated to each other to define a collection area 46 for the collection of debris and cuttings which slide off grating 34. Sections 42, 44 are provided with semi-circular cutouts 48, 50 which, when sections 42 and 44 are combined, form circular space 52 to allow mounting of trough 40 around tubular portion 12. Trough 40 may be suspended by chains or cables 54 as illustrated in FIG. 2 for maintaining it in position below tank 22 and at an angle for guiding debris down trough 40 away from the work area. Sections 42, 44 are provided with upwardly extending edges 56 to maintain collected debris within collection area 46. Sections 42, 44 are illustrated as being bolted together at flanges 58 in an overlapping fashion so as to prevent leakage of any fluids from trough 40 but may be mated together by the use of any conventional fastening means. A number of extensions 60 may be provided which hingedly connect with section 44 at narrowed portion 62 in an overlapping fashion to prevent leakage and guide the collected debris away from the work site. Extension 60 is preferably of a generally concave shape and is provided with a hinged fastening means such as that used by cement trucks. Extension 60 also is preferably constructed in lengths of approximately 4 feet so that a number of extensions may be hingedly connected together to whatever length is necessary to carry debris away from the work site.

In the preferred embodiment, the section of tubular portion 12 which extends from the floor portion or bottom plate 26 of tank 22 up through the top end of tank 22 provides primary filtering means 64 for filtering particles of debris and cutting from the drilling fluid circulated through the casing. In the preferred embodiment, primary filtering means 64 is comprised of a plurality of slotted vents or cuts 66 which are circumferentially spaced around the wall of tubular portion 12 for conveying fluid from within tubular portion 12 into tank 22 as fluid moves up tubular portion 12. In the preferred embodiment, these slotted vents 66 are preferably one foot in length by one inch in width and spaced approximately two inches apart. They are set up in 4 rows along the length of tubular portion 12 as described above.

Slots 66 serve as the primary filtering means 64 by filtering the major portion of the mixture of drilling fluid, cuttings and debris as it moves upward through tubular portion 12 towards tank portion 22 surrounding the upper section of tubular portion 12. During the filtration process, the flow or drilling fluid which is allowed to enter tank 22 through slots 66 causes a continuous turbulation of drilling fluid and smaller particles of cuttings and debris allowed to enter tank 22. This constant state of turbulation helps prevent settling of the smaller particles of cuttings and thus clogging of tank 22. The mixture of drilling fluid and smaller cutting particles in tank 22 fills tank 22 by entry through slots 66 until the level of fluid reaches that of flow conveying tube 30 at which point the mixture is directed outward through flow conveying line 30 to shakers and filters for further filtering and processing of the drilling fluid. It is crucial in the process that the mixture maintain itself in the turbulated state so that the particles of mud and cuttings allowed through slots 66 do not settle on the bottom of tank 22. The turbulation also aids in breaking down particles of cuttings into smaller particle size which have less of a tendency to settle out on the bottom of tank 22. As best seen in FIG. 4, flow conveying line 30 is positioned at a point substantially in the lower half of tank 22 to provide draining of tank 22 when the fluid level is low and in a constant turbulated state so that there is less of a tendency of the mud and cutting particles to settle out before being conveyed out of tank 22 through line 30. It can thus be seen that the greater portion of drilling fluid which is allowed to enter tank 22 is filtered through slots 66 and thus minimizes the amount of drilling fluid which must spill out the open upper end 20 of tubular portion 12 to be filtered back into tank 22.

A means for adjusting the size of primary filter means 64 and restricting the fluid flow through primary filter means 64 and the amount and size of debris or gumbo which enters tank portion 22 through slots 66 is provided within the uppermost portion of tubular member 12. Tubular sleeve 68 is opened at both ends and sized so that its outer diameter is slightly less than the inner diameter of tubular member 12 to allow placement of sleeve 68 within tubular member 12. Sleeve 68 is provided with slots 70 circumferentially spaced around the wall of sleeve 68 which correspond in relative size and position to slots 66 on tubular member 12 as seen in the cutaway view of FIG. 5. This allows positioning of sleeve 68 within tubular member 12 in a variety of positions as seen and indicated by the ARROWS in FIG. 4 between allowing full fluid flow through slots 66 into tank 22, preventing flow through slots 66 and any position between these two. Full fluid flow is allowed through slots 66 and 70 into tank portion 22 when slots 66, 70 are aligned. Fluid flow into tank 22 through slots 66, 70 is prevented by adjusting sleeve 68 as seen in FIG. 5 so that slots 66, 70 are not in alignment and flow through slots 66 is blocked by sleeve 68. A partial or restricted flow through slots 66 into tank 22 may also be achieved by positioning sleeve 68 so that slots 70 are in partial alignment with slots 66. This allows adjustment of the size of primary filter means 64, restriction of the amount and size of gumbo (mixture of drilling fluid and cuttings) which enters the tank area and elimination of gumbo buildup in the tank area. The elimination of gumbo buildup is accomplished by reducing the amount of small gumbo which enters tank 22 through slots 66 which may plug and fill tank 22 and by increasing the amount of gumbo which is forced out open-end 20 and across grating 34. The reduction of the effective size of primary filter means 64 also serves to increase the turbulation of the fluid within tank 22 and further aid in preventing gumbo build up in the tank area.

Sleeve 68 is provided with shoulder portion 72 which extends outwardly from upper edge 74. Shoulder portion 72 provides support for sleeve 68 when positioned in tubular member 12 and preventing sleeve 68 from sliding down tubular member 12, as best seen in FIG. 5. Flange 76, best seen in FIG. 4, extends radially outward from shoulder 72 and provides a means of adjusting the position of sleeve 68 while in tubular member 12 for opening and closing primary filter means 64. Movement of flange 76 and thus adjustment of sleeve 68 is limited by stops or vertical flanges 78 which may extend upwardly from tubular member 12 or grating 34. Vertical flanges 78 are spaced to allow sufficient movement of flange 76 therebetween for adjustment of sleeve 68 between the fully opened and closed positions in controlling the flow of drilling fluid and gumbo through slots 66 as described above. Oblong slot 80 is provided in the wall of sleeve 68 near upper edge 74 and provides a means for securing sleeve 68 in a selected flow control position. After sleeve 68 is adjusted to the desired position for controlling fluid flow, bolt 82 may be threaded into tubular member 12 in a threaded aperture provided therein for maintaining sleeve 68 in the selected position.

It can be seen thus that any cuttings present in the drilling fluid which would be unable to enter tank 22 through primary filter means 64 would be conveyed to upper end 20 of tubular portion 12 where it would flow out of tubular portion 12 onto grating 34. Any cuttings or debris which would be small enough to pass through grating 34 would then enter tank portion 22 where they would be directed through flow line 30 to filters and shakers during the reprocessing of the drilling fluid. Any particles of cuttings and debris which would be too large to pass therethrough would roll off of grating 34 due to the angle to the horizontal where they would fall into trough 40 to be guided away from the work site as indicated in FIG. 2. Although grating 34 is illustrated as being straight rods or wires connected between flared edge 32 and upper edge or end 20 of tubular portion 12, grating 34 may be comprised of a wire screen or a variety of filter plates to serve as secondary filter means 38. This process of filtering out the larger particles of cuttings and debris from the drilling fluid which is directed to filters and shakers through flow line 30 serves to maintain flow line 30 in a substantially unblocked condition and allow continuous operation and recirculation of drilling fluids.

A means for breaking up any gumbo or solids which may accumulate on the inside of tank 22 or in slots 66, 70 is provided in the form of a jetting system. A jetting system in the shape of a substantially horse shoe shaped ring 86 having 6 jets 88 mounted thereon at a 45° angle to the vertical and mounted in the bottom of tank 22. As seen in FIG. 6, jets 88 are mounted at 45° angles in an alternating fashion so that the fluids are directed through jets 88 at an upward angle toward wall 28 of tank 22 and slots 66 of tubular member 12. Ring 86 is hollow with each end being closed and has an inlet or fitting 91 which provides for connection of ring 86 to the rig fill up line and provision of fluid to jets 88. Ring 86 is preferably mounted in the lower portion of tank 22 with an inlet to the rig fill up line exterior of tank 22 for connection to the rig fill up line. It is preferable to use size 12/32 inch Smith bit jets on ring 86 for obtaining the most efficient flow of drilling fluids to break up an accumulated gumbo.

A second means of breaking up gumbo as it flows upward in tubular member 12 is also provided. A second ring 90 illustrated in FIGS. 1, 6 may be provided and mounted on tubular member 12 with jets 88 extending into tubular member 12 through apertures provided therein and sealed around jets 88 to prevent leakage. As drilling fluid and cuttings flow upwardly through tubular member 12, fresh drilling fluid forced into ring 90 and through jets 88 causes larger chunks of cuttings and debris to be broken up into finer particles which easily pass into and through flow conveying line 30 and to filters and separators without clogging of flow line 30. Similar to first ring 86, second ring 90 is connectable to the rig fill up line at fitting 91 for receiving a supply of fluid. First ring 86 and second ring 90 may be connected through a single line 93 to the rig fill up line by valves 95 which allow control of the amount of fluid supplied to each ring 86, 90.

A third means of breaking up gumbo which accumulates on slots 66, 70 and along the inner walls of tubular portion 12 and the well casing is also provided in the event that rings 86, 90 are ineffective or not present in the equipment being used. Sub-housing 92 is provided with three stabilizing fins 94 rigidly attached thereto and equally spaced around its circumference to serve to stabilize and center sub 92 within sleeve 68 and tubular portion 12 as it is used and illustrated in FIG. 6.

Sub 92 is comprised of a tubular body portion 96 attachable at its upper end 98 in conventional fashion to drill string member 18 or a similar fitting which may be connected to a rig fill-up line for a supply of fluid to sub 92. Sub 92 is provided with blind longitudinal bore 100 as indicated by the dotted lines in FIG. 1 which begins at upper end 98 for receiving fluid flow from drill string member 18 and does not extend throughout body portion 96 but terminates short of the lower end of body portion 96.

Three fluid jets 88, preferably being 12/32 inch Smith bit jets, are mounted in body portion 96 adjacent the bottom portion between fins 94 so as to face downwardly at an angle from 45°–60° and preferably 60°. Jets 88 are placed in fluid communication with longitudinal bore 100 via radial bores 102. In this manner, jets 88 receive fluid under pressure through bore 100 and drill string member 18 or a similar fitting from a rig fill-up line not shown and direct this pressurized fluid flow toward the inner walls of tubular portion 12, sleeve 68, slots 66, 70 or the well casing to cause removal and breakup of accumulated gumbo therein. The gumbo is broken up into large particles which may be filtered out by grating 34 and/or finer particles which may be received by tank portion 22 and flow line 30 without clogging thereof. Sub 92 is preferably constructed of a rigid material such as metal alloys normally used in the drilling industry.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An apparatus for filtering drilling mud that is recirculated out of a well casing, the apparatus comprising:
   a. a flow conveying tubular section, sealably attachable at its first lower end to the well casing for allowing fluid flow therethrough and open-ended at its top portion;
   b. an outer tank portion being at least twice the diameter of said flow conveying tubular section, encapsulating substantially the upper half portion of said tubular section, said tank portion being substantially open-ended at its top portion and attached at its bottom portion to the outer surface of said flow conveying tubular section and defining a container for receiving said filtered flow from said tubular section;

c. primary filter means comprising a plurality of vertical slotted vents equally and circumferentially spaced around the wall of that portion of said tubular section within said tank portion and in fluid communication therewith for conveying fluid out of said tubular section and into said tank portion as said fluid containing solids travels up said tubular section;

d. means for restricting the fluid flow through said primary filter means rotatably mounted on said tubular section, said means further comprising a sleeve within said tubular section having a plurality of vertical slotted vents spaced around the wall of said sleeve, rotatably mounted and selectively adjustable between a first open position allowing fluid flow through said vents in said sleeve and said tubular section to said tank portion, and a second closed position blocking fluid flow between said sleeve and said tubular section;

e. means for securing said sleeve in a selected flow controlling position;

f. secondary filter means interconnecting the top of said tubular section to the top of said tank portion for filtering solids flowing out of the top of said tubular section and allowing filtered fluid to flow into said tank;

g. means extending from the upper edge of said sleeve adapted to support said sleeve on said tubular section; and h. fluid conveying means for conveying filtered fluid out of said tank portion.

2. The apparatus of claim 1 wherein said secondary filter means comprises an angulated surface having a plurality of openings, said surface innerconnecting the top portion of said tank portion to the top end of said tubular section.

3. The apparatus of claim 1 wherein the top end of said tank portion is slightly lower than the top end of said tubular section for providing an angulated and downwardly disposed surface defining said secondary filter means.

4. The apparatus of claim 1 wherein the diameter of said tubular portion is substantially equal to the diameter of said well casing.

5. The apparatus of claim 1, further comprising a trough mounted around said tubular section below said tank portion for collecting and guiding solids filtered by said secondary filter means away from the well casing.

6. An apparatus for filtering drilling mud that is recirculated out of a well casing, comprising:

a. a flow conveying tubular section, sealably attachable at its first lower end to the well casing for allowing fluid flow therethrough and open-ended at its top portion;

b. an outer tank portion being at least twice the diameter of said flow conveying tubular section, encapsulating substantially the upper half portion of said tubular section, said tank portion being substantially open-ended at its top portion and attached at its bottom portion to the outer surface of said flow conveying tubular section, and defining a container for receiving said filter flow from said tubular section;

c. primary filter means comprising a plurality of vertical slotted vents equally and circumferentially spaced around the wall of that portion of said tubular section within said tank portion and in fluid communication therewith for conveying fluid out of said tubular section and into said tank portion as said fluid containing solids travels up said tubular portion;

d. means mounted on said tank and said tubular section for breaking up any solids which may accumulate in said slotted vents and in said tubular section adjacent the bottom portion of said tank, said means further comprising:

i. a first ring mounted on the bottom of said tank and connectable to a rig fill-up line;

ii. a plurality of fluid jets mounted on said ring for receiving fluid flow from said rig fill-up line and in communication with the interior of said tank;

iii. a second ring mounted in said tubular section and connectable to a rig fill-up line and further including a plurality of fluid jets in fluid communication with the interior of said tubular section for directing fluid into said tubular section; and iv. means for selectively controlling the amount of fluid individually supplied to said first and second rings.

7. The apparatus of claim 6 wherein said secondary filter means comprises an angulated surface having a plurality of openings, said surface innerconnecting the top portion of said tank portion to the top end of said tubular section.

8. The apparatus of claim 6 wherein the top end of said tank portion is slightly lower than the top end of said tubular section for providing an angulated and downwardly disposed surface defining said secondary filter means.

* * * * *